(12) United States Patent
Vesterinen et al.

(10) Patent No.: US 9,241,255 B2
(45) Date of Patent: Jan. 19, 2016

(54) LOCAL BREAKOUT WITH OPTIMIZED INTERFACE

(75) Inventors: Seppo Ilmari Vesterinen, Oulunsalo (FI); Wolfgang Hahn, Bergfelde (DE); Matti Einari Laitila, Oulu (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 266 days.

(21) Appl. No.: 13/255,636

(22) PCT Filed: Mar. 13, 2009

(86) PCT No.: PCT/EP2009/001853
§ 371 (c)(1),
(2), (4) Date: Sep. 9, 2011

(87) PCT Pub. No.: WO2010/102652
PCT Pub. Date: Sep. 16, 2010

(65) Prior Publication Data
US 2012/0002608 A1  Jan. 5, 2012

(51) Int. Cl.
*H04L 12/66* (2006.01)
*H04W 8/08* (2009.01)
*H04W 88/00* (2009.01)

(52) U.S. Cl.
CPC .............. *H04W 8/082* (2013.01); *H04W 88/005* (2013.01)

(58) Field of Classification Search
CPC ....... H04L 12/66; H04L 45/02; H04W 76/02; H04W 12/08; H04W 28/00; H04W 36/00; G01R 31/08

USPC .......... 370/401, 254, 256, 329, 331, 216, 27, 370/218, 219, 351, 395.21, 354, 352, 389, 370/392, 328; 455/507, 509

See application file for complete search history.

(56) References Cited

U.S. PATENT DOCUMENTS

| 8,179,903 B2 * | 5/2012 | Gupta et al. ............ 370/400 |
| 8,462,696 B2 * | 6/2013 | Vesterinen et al. ....... 370/328 |
| 2008/0259873 A1 | 10/2008 | Ahmavaara et al. |
| 2008/0285492 A1 | 11/2008 | Vesterinen |
| 2010/0323700 A1 * | 12/2010 | Bachmann et al. ....... 455/436 |

(Continued)

FOREIGN PATENT DOCUMENTS

| WO | WO2008/125729 | 10/2008 |
| WO | WO2008/132163 | 11/2008 |
| WO | WO2009/114643 | 9/2009 |

OTHER PUBLICATIONS

International Search Report and Written Opinion corresponding to International Application No. PCT/EP2009/001853 dated Dec. 9, 2009.

(Continued)

*Primary Examiner* — Hanh N Nguyen
(74) *Attorney, Agent, or Firm* — Squire Patton Boggs (US) LLP

(57) ABSTRACT

The present invention relates to methods, apparatuses, and computer program products at interrelated entities of a network system for providing access via a cellular access network to a packet data network, wherein a simple local IP access or local breakout (LBO) feature is provided, which uses a bridging function between a packet data network interface and a radio interface in an access device (e.g. base station device or HNB) that can be controlled by a single control plane interface.

17 Claims, 9 Drawing Sheets

(56) References Cited

U.S. PATENT DOCUMENTS

2014/0003391 A1* 1/2014 Vesterinen et al. ............ 370/331
2014/0198637 A1* 7/2014 Shan et al. .................... 370/229

OTHER PUBLICATIONS

3GPP TS 23.401 V8.4.1 (Dec. 2008), 3rd Generation Partnership Project; Technical Specification Group Services and System Aspects; General Packet Radio Service (GPRS) enhancements for Evolved Universal Terrestrial Radio Access Network (E-UTRAN) access (Release 8), pp. 1-219.

3GPP TS 36.331 V8.4.0, "3rd Generation Partnership Project; Technical Specification Group Radio Access Network; Evolved Universal Terrestrial Radio Access (E-UTRA) Radio Resource Control (RRC); Protocol specification (Release 8)", Dec. 2008, pp. 1-198.

3GPP TS 36.413 V8.4.0 (Dec. 2008) Technical Specification, 3rd Generation Partnership Project; Technical Specification Group Radio Access Network; Evolved Universal Terrestrial Radio Access Network (E-UTRAN); S1 Application Protocol (S1AP), (Release 8), Dec. 16, 2008, pp. 1-205.

3GPP TR R3.020 V0.9.0 (Sep. 2008), Technical Report,. 3rd Generation Partnership Project; Technical Specification Group Radio Access Network; Home (e)NodeB; Network aspects (Release 8), Sep. 2008, pp. 1-63.

3GPP TS 23.401 V8.4.0 (Dec. 2008) Technical Specification, 3rd Generation Partnership Project; Technical Specification Group Services and System Aspects; General Packet Radio Service (GPRS) enhancements for Evolved Universal Terrestrial Radio Access Network (E-UTRAN) access (Release 8), Dec. 16, 2008, pp. 1-219.

3GPP TS 22.220 V1.0.1 (Dec. 2008) Technical Specification, 3rd Generation Partnership Project; Technical Specification Group Services and System Aspects; Service requirements for Home NodeBs and Home eNodeBs (Release 9), Dec. 19, 2008, pp. 1-21.

3GPP TSG-SA1 #43, Check up of Editors notes in TS 22.220, Editor of TS 22.220 (NEC), S1-084111, Miami, Florida, Nov. 17-21, 2008, 2 pages.

Technical Specification Group Services and System Aspects, Meeting #42, "Presentation for Information of TS 22.220, Version 1.0.0, on Home Node B (HNB) and Home eNodeB (HeNB)," SP-080790, Athens, Greece, Dec. 8-11, 2008, 2 pages.

* cited by examiner

LOCAL BREAKOUT WITH OPTIMIZED INTERFACE

FIELD OF THE INVENTION

The present invention relates to methods, apparatuses and computer program products for providing a network system which enables access via a radio access network to a packet-switched network, such as—but not limited to—Universal Mobile Communications System (UMTS) or Long Term Evolution (LTE) or Local Area Network (LAN) networks.

BACKGROUND OF THE INVENTION

Home base stations, Home NodeBs, Femto eNodeBs (eNBs) or any type of home access device (in the following referred to as "HNB") have become a widely discussed topic within 3$^{rd}$ Generation Partnership Project (3GPP) as well as in the operator and manufacturer community. When deployed in homes and offices, HNBs allow subscribers to use their existing handsets—in a building—with significant improved coverage and increased broadband wireless performance. Moreover, Internet Protocol (IP) based architecture allows deployment and management in virtually any environment with broadband Internet service.

In current standardization activities, deployment scenarios involving Femto Base Stations in the context of 3G and LTE is attracting great interest from manufacturers and operators. The current status in 3GPP standardization activities is that HNB deployment has been acknowledged by several working groups and official documents have been drafted to capture the requirements concerning such HNB deployments.

In 3GPP specification TS 22.220, local IP access in home based networks has been described, wherein local IP breakout (LBO) from HNB to home based networks or to the Internet has been suggested in addition to ordinary IP based services via the operator's core network. Allowing for local breakout (also referred to as "route optimization") of IP traffic could both shorten the end-to-end route and reduce the load on relatively expensive IP backbones (which inherently provides a high quality of service).

Local IP access is intended to differentiate user's local IP traffic in the HNB so that local IP traffic to/from IP devices connected to home based networks is forwarded on the shortest path so that it does not transit outside the home based network (i.e. remains Intranet traffic). Moreover, local IP access traffic to the Internet does not necessarily transit across the operator's evolved packet core (EPC), i.e., the Internet traffic would be forwarded to and received from the Internet via a gateway local to a base station without having to transit through the operator's core nodes.

The current 3GPP specifications and contributions suggest integrating a General Packet Radio Services (GPRS) Gateway Support Node (GGSN) or another kind of gateway function into the HNB for implementing local breakout to home based networks or to the Internet. However, implementing a local gateway for local IP access into the HNB requires incorporation of lots of gateway functions (such as tunnelling, charging, Home Agent etc.), so that complexity and processing load is increased and an agreed split between radio access network (RAN) and core network is violated. Furthermore, gateway devices are modelled as IP routers that perform IP lookup for routing user traffic to/from 3GPP specified bearer services. Thus, if local breakout was done at a GGSN-like IP router function in the HNB, this would lead to the disadvantage that every kind of inter HNB handover will result in a change of GGSN and thus require use of a cell reselection procedure. In other words, modelling a local gateway functionality within the HNB as an IP router would limit IP mobility and session continuation to work just when the served terminal device (e.g. user equipment (UE)) is connected to the current HNB. This would lead to a severe limitation e.g. in local area scenarios like in an office or campus where local IP access could be served through a multiple cells or base stations in the local area.

The WO2008/125729A1 discloses a method, radio system, mobile terminal and base station for providing local breakout or local IP access, wherein local access session or service management is performed at EUTRAN (Evolved Universal Terrestrial Radio Access Network) level when the need for core network interfaces to control the local gateway functionality can be eliminated. However, radio resource control (RRC) and non-access stratum (NAS) interfaces still need to be modified accordingly, which might lead to support or compatibility related problems.

SUMMARY

Among others, it is an object of the present invention to provide a simplified gateway functionality in a base station device so that gateway management can be handled locally with less modifications of interfaces.

This object is achieved—at a terminal side—by an apparatus comprising:
  selecting means for selecting at a terminal device and in response to a detected availability of a local breakout service an identification of a virtual gateway functionality provided at an access device of a radio access network, for use in a local breakout to a packet data network;
  address configuration means for configuring a network layer address for said terminal device in said local breakout; and
  message generating means for generating a connectivity request indicating said identification, to be transmitted to said radio access network.

Furthermore, the above object is achieved—at the terminal side—by a method comprising:
  selecting at a terminal device and in response to a detected availability of a local breakout service an identification of a virtual gateway functionality provided at an access device of a radio access network, for use in a local breakout to a packet data network;
  configuring a network layer address for said terminal device in said local breakout; and
  generating a connectivity request indicating said identification, to be transmitted to said radio access network.

Additionally, the above object is achieved—at the terminal side—by a computer program product comprising code means for producing the above method steps when run on a computing device.

Furthermore, at a radio access network side, the above object is achieved by an apparatus comprising:
  deriving means for deriving at an access device radio bearer-related parameters from a bearer setup request;
  determination means for determining a local breakout based on said derived parameters;
  gateway configuration means for configuring a virtual gateway functionality at said access device in response to said determination means; and
  traffic bridging means for bridging user traffic between a radio bearer service requested by said bearer setup request and a packet data network for said local breakout.

Additionally, at the access network side, the above object is achieved by a method comprising:
- deriving at an access device radio bearer-related parameters from a bearer setup request;
- determining a local breakout based on said derived parameters;
- configuring a virtual gateway functionality at said access device in response to said determination; and
- bridging user traffic between a radio bearer service requested by said bearer setup request and a packet data network for said local breakout.

In addition, at the radio access network side, the above object is achieved by a computer program product comprising code means for producing the above method steps when run on a computing device.

Moreover, at a core network side, the above object is achieved by an apparatus comprising:
- selecting means for selecting at a core network a set of parameters for local breakout based on an identification of a virtual gateway functionality provided at an access device of a radio access network; and
- setting means for setting predetermined default parameter values in a bearer setup request to indicate local breakout at said virtual gateway functionality.

Additionally, at the core network side, the above object is achieved by a method comprising:
- selecting at a core network a set of parameters for local breakout based on an identification of a virtual gateway functionality provided at an access device of a radio access network; and
- setting predetermined default parameter values in a bearer setup request to indicate local breakout at said virtual gateway functionality.

Furthermore, at the core network side, the above object is achieved by a computer program product comprising code means for producing the above method steps when run on a computing device.

Accordingly, a simple local IP access feature or local breakout feature using a bridging function between the packet data network interface and the radio interface in the access device (e.g. HNB) is provided, which can be controlled with minimal modifications in the existing control plane interfaces (e.g. S1 control plane interface) while keeping RRC, NAS or other related protocols unmodified. More specifically, the control plane interface does not need to be extended with other functionalities (e.g. S11 functionalities) due to the fact that no communication is needed between the terminal device and other local S-/P-gateway functionalities. Address allocation at the terminal device can be handled locally and the core network side (e.g. Mobility Management Entity (MME)) can be in charge of session or bearer service management.

Since the virtual gateway function can be co-located in or at the access device of the radio access network, formally required tunnels become node internal issues and are no longer needed. All related tunnel configuration data can be omitted. The core network side knows all local access bearer service parameters which therefore can be delivered in a message to the access device. As a result, a local access bearer service can be configured in the access device without any additional core network interface, using only one control plane interface and thus requiring minimal modifications. This optimized interface based approach provides the advantage that a simplified local breakout control procedure with minimal number of messages using only a single interface between the radio access network and the core network can be provided and no additional core network interfaces have to be terminated in the access device of the radio access network.

Additionally, the optimized local breakout interface also enables a simplified implementation of local mobility in inter access device handovers without need for performing S-/P-gateway relocation procedures on every handover. Now, the management of the co-located virtual gateway functionality for simple local breakout can be handled locally after the breakout service is set up. There is no need to perform tunnel path switching via the core network to an external gateway.

The address configuration means at the terminal side apparatus can be adapted to use a dynamic host configuration protocol or an Internet protocol address auto-configuration to configure the network layer address.

Furthermore, the radio access network side apparatus can be configured to issue a bearer setup response with a predefined value for at least one of a transport layer address and a tunnel endpoint identifier, said predetermined value indicating that no tunnelling is needed.

Additionally, the bearer setup request may be received via an S1-type control plane interface. In this case, the virtual gateway functionality may only be controlled via the S1-type control plane interface.

According to another aspect, the radio access network side apparatus may be configured to issue a paging trigger for an idle terminal via the S1-type control plane interface.

According to another aspect, the radio access network side apparatus may be configured to remove a local breakout bearer from a list of bearers to be handed over and to release the local breakout bearer towards the terminal device in case of a handover procedure.

The set of parameters selected at the core network side apparatus may comprise at least one of reserved or default address values for the virtual gateway functionality and a terminal device requesting the local breakout, an aggregate maximum bitrate for local breakout bearers, a checking value of the virtual gateway functionality for checking if local breakout is allowed in parallel to other existing connections, and traffic flow templates which define filter criteria for the local breakout access.

Additionally, the predetermined default parameter values set at the core network side apparatus may comprise at least one of a transport layer address with a predefined value indicating that no tunnel endpoint address is needed, a tunnel endpoint identifier with a predetermined value indicating that no tunnelling is needed, and an aggregate maximum bitrate.

In addition, the apparatus at the core network side may be configured to be provided in a mobility management entity of the core network.

Other advantageous modifications are defined in the dependent claims.

BRIEF DESCRIPTION OF THE DRAWINGS

The invention will now be described in greater detail based on embodiments with reference to the accompanying drawings in which.

DESCRIPTION OF THE EMBODIMENTS

In the following, embodiments of the present invention will be described based on an exemplary and non-limiting LTE network architecture.

Figure 1:
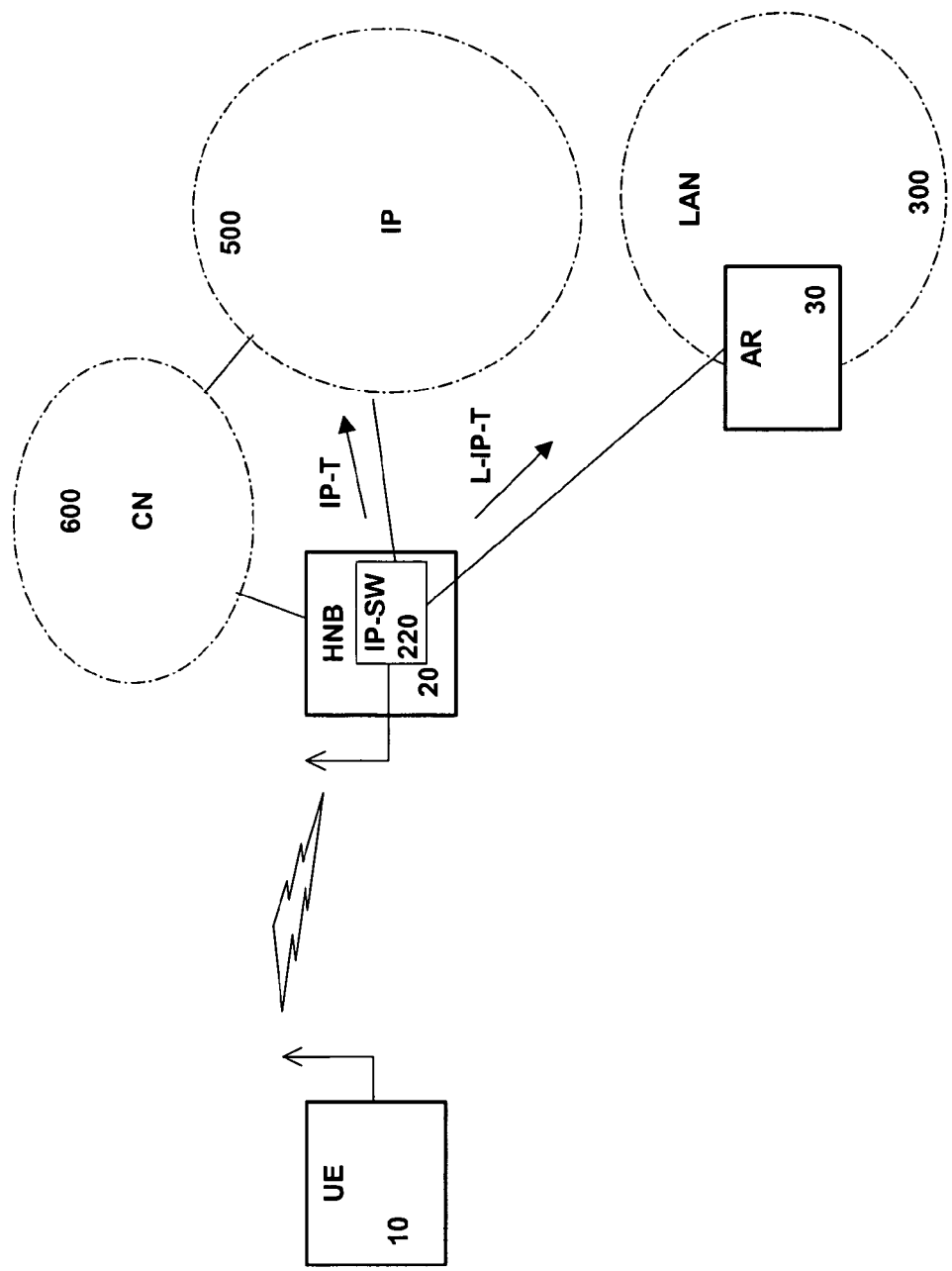
FIG. 1 shows a schematic network architecture with a HNB involving a link layer switching functionality.

FIG. 1 shows a schematic network architecture comprising at least one HNB 20 with added virtual gateway functionality in a subscriber home environment, e.g. within a building, and connected to an operator's core network (CN) 600, an IP network 500 and a home based LAN 300 with an access router (AR) 30. The HNB 20 comprises an IP switch (IP-SW) 220 for switching IP traffic directly to the IP network 500 or the LAN 300 without involvement of the CN 600. The IP switch 220 thus serves to provide the virtual gateway functionality for LBO of local IP traffic (LIP-T) and other IP traffic (IP-T). The IP traffic may originate from or terminate at a UE 10 which is wirelessly connected to the HNB 20 via an air interface.

The HNB 20 which serves the UE 10 comprises an interface towards the LAN 300 and the IP network 500, which provides a termination point for the UE 10 from the LAN 300 and the IP network 500.

Thus, instead of implementing a full IP router functionality in the HNB 20 for local IP access (or LBO) services—like it would be in case of conventional gateway salutions—, the gateway functionality at the HNB 20 can be simplified to operate as a switching or bridging function for user IP traffic between the LAN 300 (home based network) or the IP network 500 and an UE specific point-to-point link over the radio interface (bearer service). The switching or bridging functionality may be an IP aware functionality which means that this functionality provided by the IP switch 220 can behave as a "UE proxy" towards the LAN 300 or the IP network 500, so that it serves not only to assist the UE 10 in assigning an IP address and support neighbour discovery functions, but also to enable performing link layer mobility transparently to the UE 10 and eliminating the need for using some IP mobility mechanisms in the local IP access service area.

According to the Open Systems Interconnection Reference Model (OSI Model), network architectures are divided into seven layers which, from top to bottom, are designated application, presentation, session, transport, network, link (or datalink), and physical layer. A layer can be regarded as a collection of conceptually similar functions that provide services to the layer above it and receives services from the layer below it. For example, a layer that provides error-free communication across a network provides the path needed by applications above it, while it cause the next lower layer to send and receive packets that make up the contents of the path.

In the present embodiments, link layer (also referred to as "L2") and network layer (also referred to as "L3") levels are distinguished. The network layer provides the functional and procedural means of transferring variable length data sequences from a source to a destination via one or more networks, while maintaining the quality of service requested by the transport layer. The network layer performs network routing functions, and might also perform fragmentation and reassembly, and report delivery errors. Routers operate at this layer—sending data through the extended network and making the Internet possible. A well-known example of a network layer protocol or L3 protocol is the Internet Protocol (IP). It manages the connectionless transfer of data one hop at a time, from end system to ingress router, router to router, and from egress router to destination and system. It is not responsible for reliable delivery to a next hop, but only for the detection of erroneous packets so that they may be discarded or corrected. When the medium of the next hop cannot accept a packet in its current length, IP is responsible for fragmenting the packet into sufficiently small packets which a medium can accept.

The (data) link layer (L2) provides functional and procedural means to transfer data between network entities and to detect and possibly correct errors that may occur in the physical layer (also referred to as "L1"). The proposed IP switch 220 may be provided in a user plane interface of the HNB 20 and could be implemented as link layer device (e.g. L2 switch) from the point of view of the LAN 300 and the IP network 500. This means that from the viewpoint of the UE 10 or the HNB 20, its local IP point of attachment is located in the external next hop router seen from the HNB 20. In the LAN 300, as a home or local area network (office, campus etc.), this next hop router may be a default gateway to external networks, provided e.g. in a separate digital subscriber line (DSL) router box. Or, in case of the IP network 500 it may be the nearest IP router in the Internet service provider (ISP) network.

In case an IP aware bridging or switching function is realized in the IP switch 220, the HNB 20 can perform IP lookup in order to forward user downlink traffic to a corresponding UE specific bearer service (i.e. point-to-point link) over the radio interface. Another alternative for implementing the IP aware bridging or switching function could be to model the IP switch 220 as a wireless L2 switch. In this case, the forwarding decision for user local IP traffic from the LAN 300 or the IP network 500 to the corresponding UE specific bearer service can be done based on UE specific link layer addresses (e.g. Ethernet MAC addresses).

The suggested IP switch 220 in the HNB 20 thus provides the advantage that there is no need to run an IP routing protocol, to perform router advertisements or the like. In the uplink direction the HNB 20 simply forwards the local IP access traffic directly to its network interface in the LAN 300 or the IP network 500 and does not require any tunnelling protocol or other IP tunnelling.

The advantage of the proposed HNB 20 with IP switch 220 can be recognized from local IP access service with IP session continuation support between multiple HNBs or other kinds of base stations connected with the same local area without necessitating any mobility agent node (e.g. home agent in proxy mobile IP) in the LAN 300 or the IP network 500.

Figure 2:
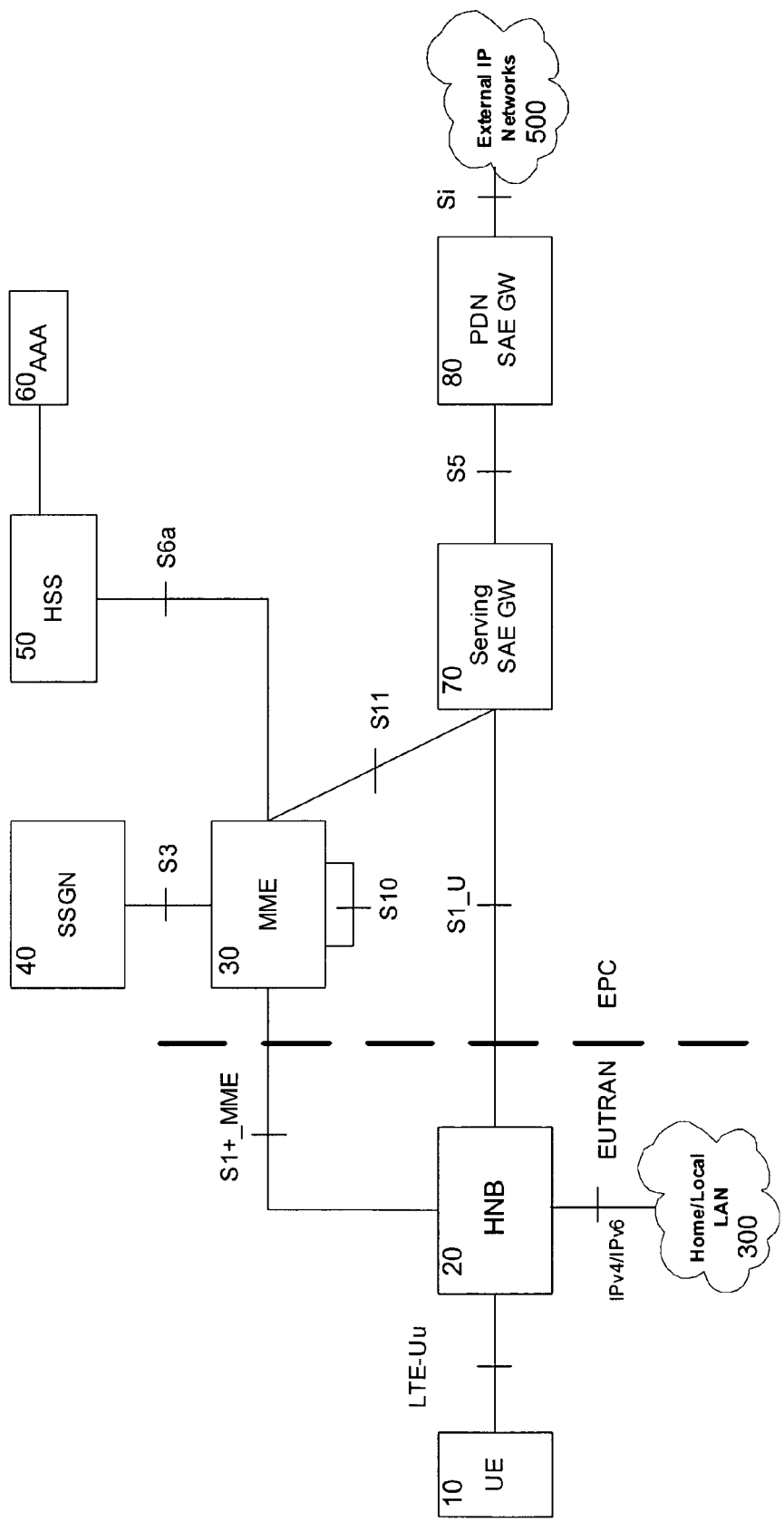
FIG. 2 shows a more detailed architecture of the network system with involved network elements.

FIG. 2 shows a more detailed block diagram of network entities involved in a local IP access or LBO procedure and corresponding interfaces between those network entities. The exemplary network architecture of FIG. 2 is based on an EUTRAN system as described for example in the 3GPP specification TS23.401 V8.4.0.

LBO of IP traffic via a visited public land mobile network (PLMN) is supported, when network policies and user subscription allow it. LBO may be combined with support for multiple simultaneous packet data network (PDN) connections. The bold dashed line in FIG. 2 separates the EUTRAN part of the network system from the evolved packet core (EPC) of the network system. A UE 10 is connected via a LTE-Uu interface to a HNB 20. The HNB 20 is connected via a IPv4/IPv6 interface to a Home/Local LAN 300. Additionally, the HNB 20 is connected via a S1-MME interface to at least one MME 30 of the EPC. This S1-MME interface forms a reference point for the control plane protocol between the EUTRAN and the MME. The MME 30 is connected via a S3 interface to a Serving General Packet Radio Services (GPRS) Support node (SGSN) 40. The S3 interface enables user and bearer information exchange for inter 3GPP access network mobility in idle and/or active state. Furthermore, the MME 30 is connected via a S6a interface to a Home Subscriber Server (HSS) 50 in which subscriber data are stored. The S6a interface enables transfer of subscription and authentication data for authenticating/authorizing user access to the evolved system between the MME 30 and the HSS 50. The HSS 50 is also connected to an authentication, authorization, and accounting (AAA) server 60 which manages fundamental system access functions.

As additional entities, the EPC comprises a serving SAE gateway (S-GW) 70 and a PDN SAE gateway (P-GW) 80 which provide a gateway function to external IP networks 500. The S-GW 70 is connected via a S11 interface to the MME 30, wherein the S11 interface provides a reference point between the MME 30 and the S-GW 70. Additionally, the S-GW 70 is connected via a S1_U interface to the HNB 20, wherein the S1-U interface provides a reference point between the EUTRAN and the S-GW 70 for the per bearer user plane tunnelling and inter-HNB path switching during handover.

At the MME 30, a S10 interface provides a reference point between MMEs for MME relocation and MME to MME information transfer. The S-GW 70 and P-GW 80 are connected via a S5 interface which provides user plane tunnelling and tunnel management between these gateways. It can be used for S-GW relocation due to UE mobility and if the S-GW 70 needs to connect to a non-co-located PDN gateway for the required PDN connectivity. It is noted that the P-GW 80 and the S-GW 70 may be implemented in one physical node or separate physical nodes. The S-GW 70 is the gateway which terminates the interface towards the EUTRAN. For each UE associated with the EPS, at a given point of time, there may be a single S-GW as a local mobility anchor point for inter-HNB handover, responsible for packet routing, forwarding and lots of other gateway functions. The P-GW 80 is the gateway which terminates the interface towards the PDN, e.g., the external IP network 500. The PDN may be any operator external public or private packet data network or an intra-operator packet data network, e.g. for provision of IP multimedia subsystem (IMS) services. If the UE 10 is accessing multiple PDNs, there may be more than one P-GW for that UE 10.

According to some of the embodiments it is assumed that instead of terminating core network interfaces (like S5, S11, Gn or Gx for example) in the HNB 20 for controlling a subset of gateway functions (like Gateway GPRS Support Node (GGSN) or S-/P-GW functions) for local IP access services, a simple local IP access feature using the simple bridging function of the IP switch 220 in the HNB 20 can be controlled with minimal modifications in the existing S1 control plane interface (or Iu interface for 3G systems) and keeping the RRC and NAS protocols unmodified.

In such a local IP access or LBO, the LBO session management can be handled at NAS level using multiple PDN support. From the UE point of view local U-plane handling can be made transparent and LBO sessions can be mapped to an UE requested PDN connectivity if the access point name (APN) is associated to the local virtual gateway provided at the HNB 20. Then, the MME 30 can still work according to the 3GPP specifications with a modified gateway handling procedure.

Users that have no local IP access subscription (LBO subscription) or HNBs that do not support LBO can use conventional EPS bearer services provided by the core network. The UE 10 is always anchored to the MME 30 on the control plane. The default EPS bearer service is always activated and handled from the S-GW 70 and/or the P-GW 80 of the core network (EPC).

As the HNB 20 provides an internal virtual gateway function, only a minimal set of S-/P-GW functions are needed in the HNB 20 for the LBO service. The simple virtual gateway function can be controlled solely over the S1 interface by delivering the required LBO control information in an S1 application protocol signalling. For example, this could be achieved by the E-RAB Setup Request and E-RAB Setup Response messages as specified for example in the 3GPP specification TS 36.413. Of course, other signalling messages delivered via the S1 interface or similar control plane interfaces of other network systems could be used as well.

Thus, according to some embodiments, the S11 control interface could be omitted at the HNB 20.

Figure 3:
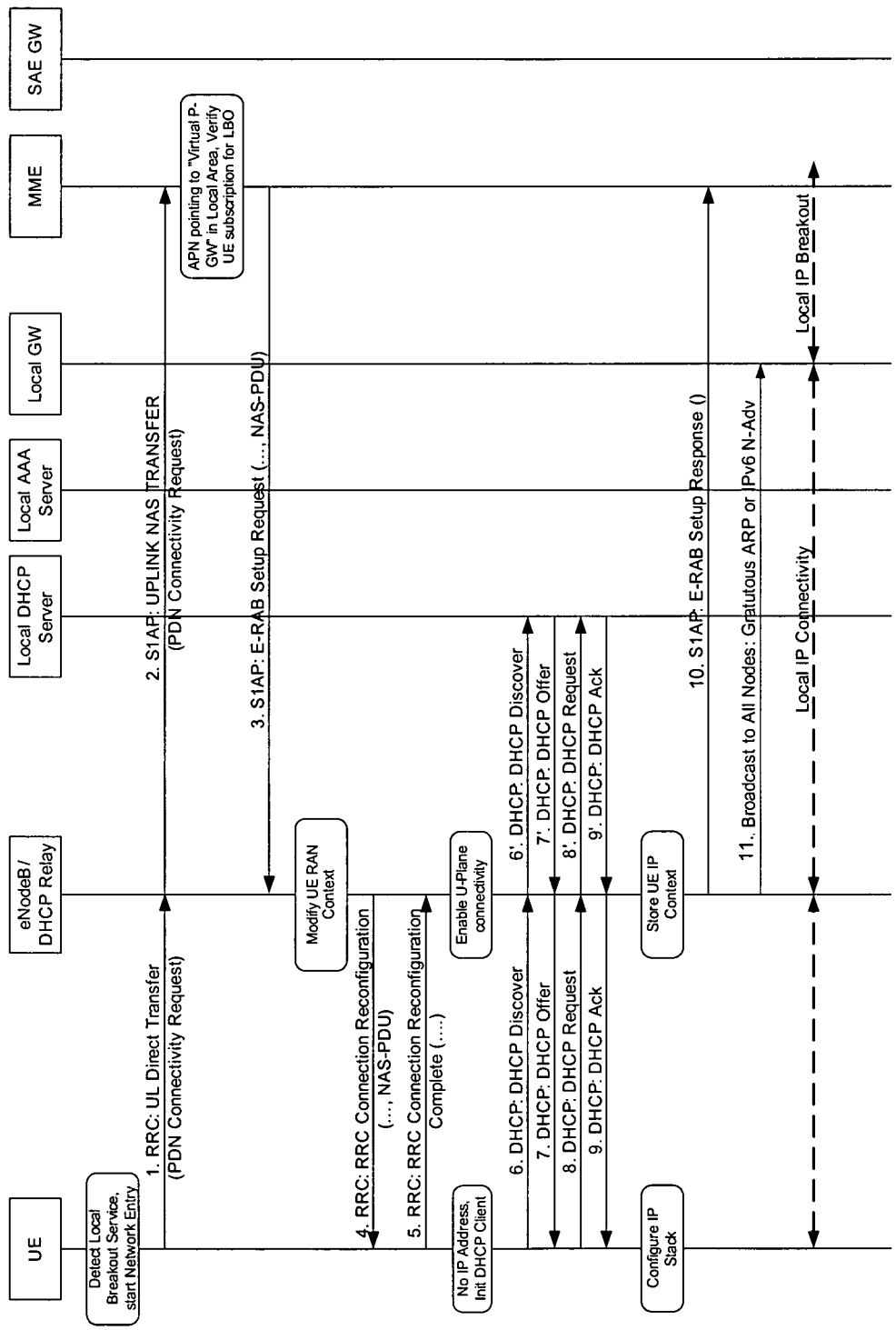
FIG. 3 shows a signalling and processing diagram indicating signalling messages and specific processings performed at involved entities of the concerned network system.

FIG. 3 shows a signalling and processing diagram which indicates messages and processing in connection with a UE requested PDN connectivity procedure for local IP access or LBO setup by terminating only the S1 interface in the HNB.

As can be gathered from FIG. 3, when the UE 10 detects an LBO service e.g. based on a corresponding broadcast information, it starts network entry by sending a PDN connectivity request via an RRC direct transfer in uplink (UL) direction to the HNB 20 (step 1) which can act as a DHCP relay. The HNB 20 forwards the received connectivity request via the S1 interface as an uplink NAS transfer to the MME 30 (step 2). The connectivity request includes an APN pointing to the virtual gateway at the HNB 20. The MME 30 verifies the UE subscription for LBO e.g. by initiating a query to the HSS 50 or a corresponding subscriber data base. Based on the result of the query, the MME 30 issues an E-RAB Setup Request including a NAS packet data unit (PDU) via the S1 interface (step 3). Based on the information given in the E-RAB Setup Request, the HNB 20 modifies its UE RAN context and sends an RRC connection reconfiguration message including the NAS-PDU to the UE 10 (step 4). In step 5, the UE 10 responds with a RRC Connection Reconfiguration Complete message based on which the HNB 20 enables user plane connectivity.

If the E-RAB Setup Request message from the MME 30 does not contain valid network address and TEID (Tunnel End Point Identifier) value for establishing a GTP tunnel on the S1 user-plane, the HNB 20 detects that bearer setup is for a Local IP Access service using a HNB internal virtual gateway function.

If the connection reconfiguration message from the HNB 20 does not contain any IP address for the UE 10, the UE 10 initiates an address configuration procedure at a DHCP client. To achieve this, a DHCP Discover message is sent in steps 6 and 6' via the HNB 20 to a local DHCP server (not shown in FIG. 2), which responds with a DHCP Offer message in steps 7 and 7' forwarded to the UE 10 via the HNB 20. Based on the suggested IP address, the UE 10 sends a DHCP Request in steps 8 and 8' via the HNB 20 to the local DHCP server which acknowledges the requested address in steps 9 and 9'. Based on the result of the DHCP address configuration procedure, the UE 10 configures its IP stack and the HNB 20 stores the IP context of the UE 10. Of course, other address configuration procedures, such as IPv6 address auto-configuration or the like could be used as well.

The HNB 20 now forwards in step 10 a E-RAB Setup Response message to the MME 30 and broadcasts in step 11 to all nodes a notification or request with the own IP address allocated to the UE 10 as a target address in order to check whether this IP address is used more than one time and/or to update tables or stacks in other nodes. This notification may be a gratuitous Address Resolution Protocol (ARP) request packet, wherein "gratuitous" in this case means a request/reply that is not normally needed according to the ARP specification but could be used in some cases. As an alternative, a corresponding IPv6-N-adv (Neighbor Advertisement) message could be sent.

Thus, the S1 interface does not need to be extended with some S11 functionality, since there is no communication between the UE 10 and the local S-/P-GW functionality. The IP address allocation of the UE 10 can be handled locally (e.g. not based on 3GPP signalling) while the MME 30 is in charge of session management (bearer service management). Since the virtual gateway functions are co-located in the HNB 20, the S1-U and S5-U GTP tunnels become internal issues of the HNB 20 and are thus not needed, which means that all related GTP tunnel configuration data (e.g. TEIDs) can be omitted. The MME 30 as decision manager knows all local IP access bearer service parameters which can be delivered to the HNB 20.

An enhancement for the E-RAB Setup Request via the S1 interface could be the use of the APN aggregate maximum bitrate (AMBR) parameter for LBO bearer(s). This would allow guaranteeing a certain relation of the resource usage of the LBO bearer(s) compared to the bearers carried via the operator network. This or other traffic shaping parameters can be provided to the HNB 20 by management or manual configuration generally for all APNs. E.g., n percent of the backhaul of RAN capacity of core network based bearers (e.g. default EPS bearers) could be reserved. IP address(es) for the UE 10 are assigned from the IP subnet or LAN where the HNB 20 is connected, i.e., locally with assistance of the HNB 20 or itself by the UE 10. In case flatrate charging is used in connection with the local IP access or LBO, charging functions can be omitted in the HNB 20.

As a conclusion, the local IP access or LBO bearer service can be configured in the HNB 20 without S11 interface or other interfaces with core network gateways by using only the S1 interface ("S1+") requiring minimal modifications of the use of the S1 application protocol and for example in the Bearer setup request and bearer setup response messages (e.g. E-RAB Setup Request and E-RAB Setup Response).

Figure 4:
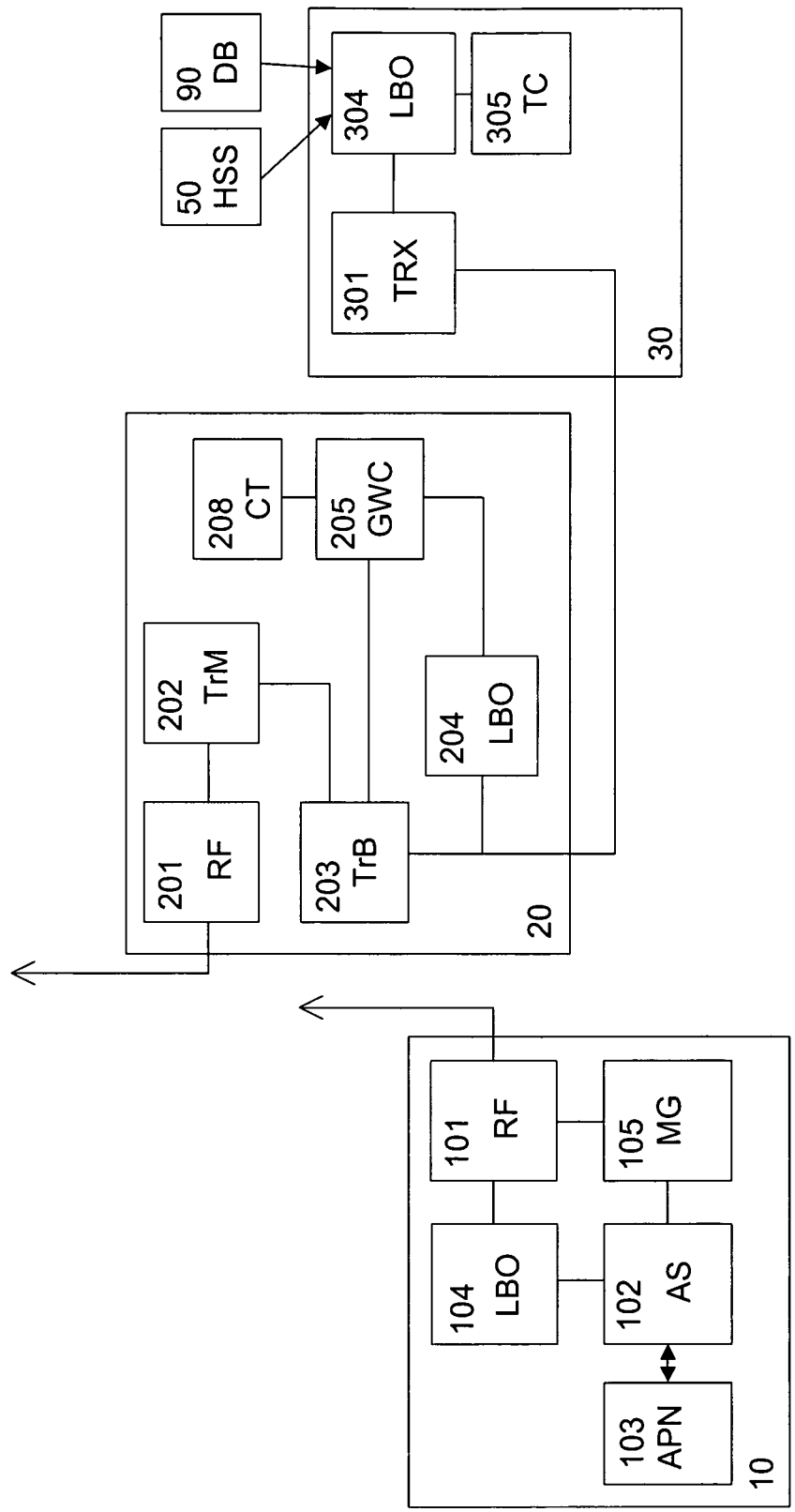
FIG. 4 shows schematic block diagrams of entities involved in the proposed network system.

FIG. 4 shows schematic block diagrams of the UE 10, the HNB 20 and the MME 30. It is noted that this block diagram is a simplified representation without separation of control plane and user plane connections.

The UE 10 comprises a radio frequency (RF) unit 101 which is configured to transmit and receive radio signals via the radio interface (e.g. LTE-Uu interface) towards the HNB 20 of the RAN. Furthermore, the UE 10 comprises a LBO control function or unit 104 configured to perform LBO related processing and detect LBO related signalling. The LBO control unit 104 checks received messages or broadcast information from the RAN, detects LBO services and initiates LBO related network entry if it has detected an LBO service. Furthermore, if the initial LBO related message exchange with the MME 30 via the HNB 20 indicates that no IP address has been reserved or proposed for the UE 10, an address selection procedure is initiated by an address selection function or unit (AS) 102 which provides information to a message generator (MG) function or unit 105 to initiate an address configuration operation, e.g., based on DHCP or IPv6. Messages generated at the message generator unit 105 are transmitted via the RF unit 101 to the radio interface. The address selection unit 102 can access an APN storage 103 where APNs can be stored for various connections or purposes.

The HNB 20 also comprises a RF unit 201 in order to enable communication to UEs or other terminal devices via the radio interface. Traffic received via the RF unit 201 can be monitored in a traffic monitoring function or unit (TrM) 202. Additionally, traffic received from the RF unit 201 or sent to the RF unit 201 can be forwarded via a traffic bridging function or unit (TrB) 203 which provides a bridging function between radio bearer services and PDN related connections. Thereby, a direct bridging or switching function can be achieved between the MME 30 and the UE 10.

Furthermore, the HNB 20 comprises a LBO control function or unit 204 which is configured to control a gateway configuring function or unit (GWC) 205 which can access a context storage unit (CT) 208. The traffic monitoring unit 202 and the gateway configuring unit 205 both can control the traffic bridging unit 203. Traffic flowing through the traffic bridging unit 203 is routed to or from a transceiver unit (TRX) 301 of the MME 30 via the S1 interface. The traffic received from or transmitted to the transceiver unit 301 can be supplied to a LBO control function or unit 304 which controls a tunnel configuration function or unit (TC) 305 configured to provide tunnel configuration signalling towards the core network. The LBO control unit 304 accesses the HSS 50 or another subscriber-related data base 90 in order to derive LBO-related parameters needed to establish local IP access or LBO.

It is noted that the functions or unit described in connection with FIG. 4 can be implemented as discrete hardware units or circuits or as software routines controlling a processor unit or several processor units provided at the UE 10, the HNB 20 and/or the MME 30.

In the following, flow diagrams describing the LBO or local IP access related functions at the UE 10, the HNB 20, and the MME 30 are described in more detail based on FIGS. 5 to 7.

Figure 5:
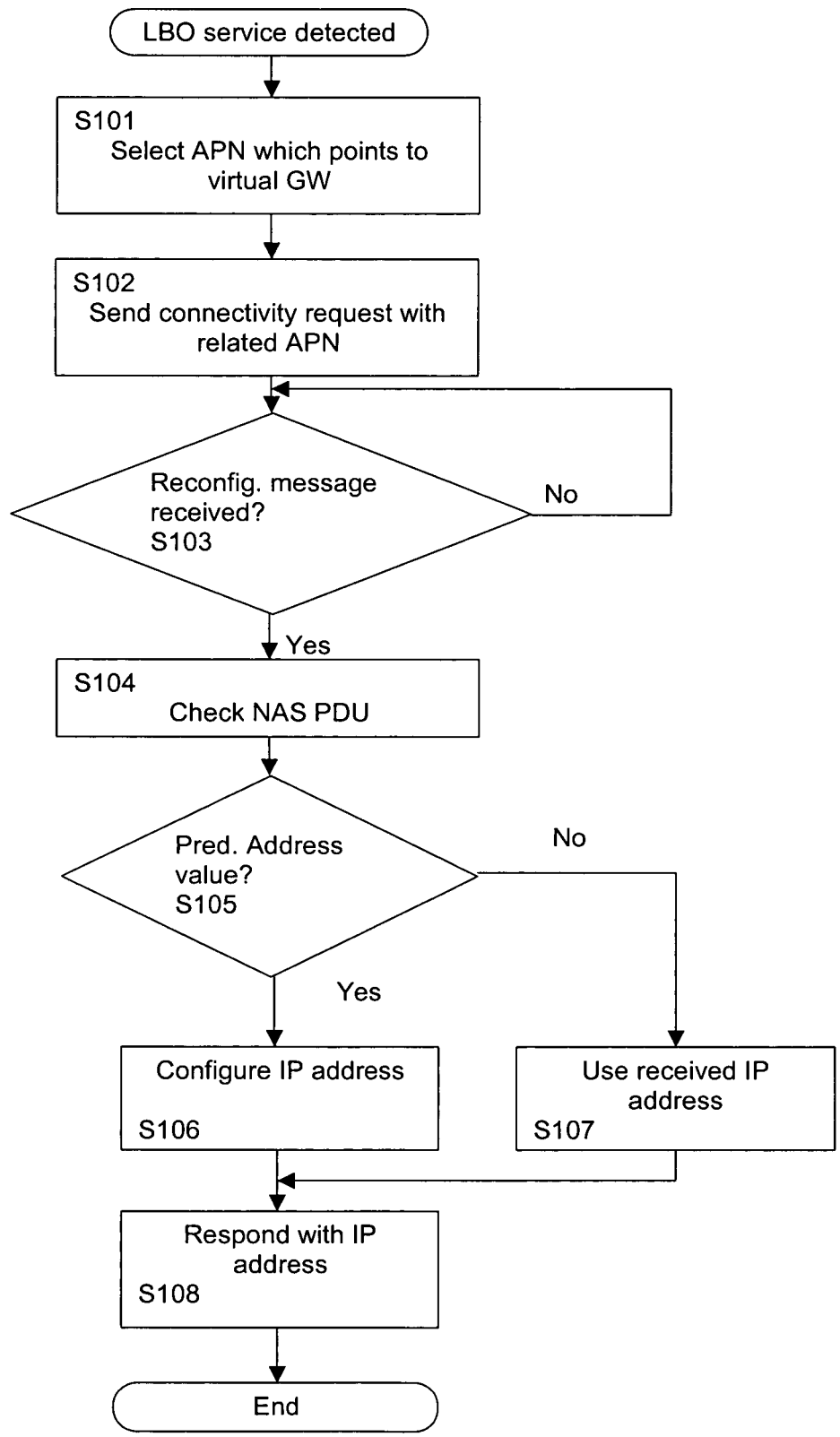
FIG. 5 shows a schematic flow diagram of a local breakout processing at a terminal side.

FIG. 5 shows a schematic flow diagram of an LBO or local IP access related processing at the UE 10. When the UE 10 (e.g. the LBO control unit 104) detects a LBO service, an APN which points to the virtual gateway at the HNB 20 is selected in step S101 (e.g. by the address selecting unit 102). Then, a connectivity request (e.g. generated by the message generator 105) is sent with the related APN to the network targeted to MME 30 in step S102.

Now, the UE 10 waits for receipt of a reconfiguration message (step S103). If a reconfiguration message is received, the NAS PDU provided in the reconfiguration message is checked in step S104 (e.g. by the LBO control unit 104). If it is determined in step S105 that a predetermined address value is set in the NAS PDU (e.g. a zero address) an IP address configuration is initiated in step S106 (e.g. by the address selecting unit 102). If the predetermined address value is not determined, the received IP address is used (step S107). Finally, the UE 10 responds to its application layer that IP connectivity is available with the selected APN and IP address S108 using the local IP access or LBO with virtual gateway function at the HNB 20.

Figure 6:
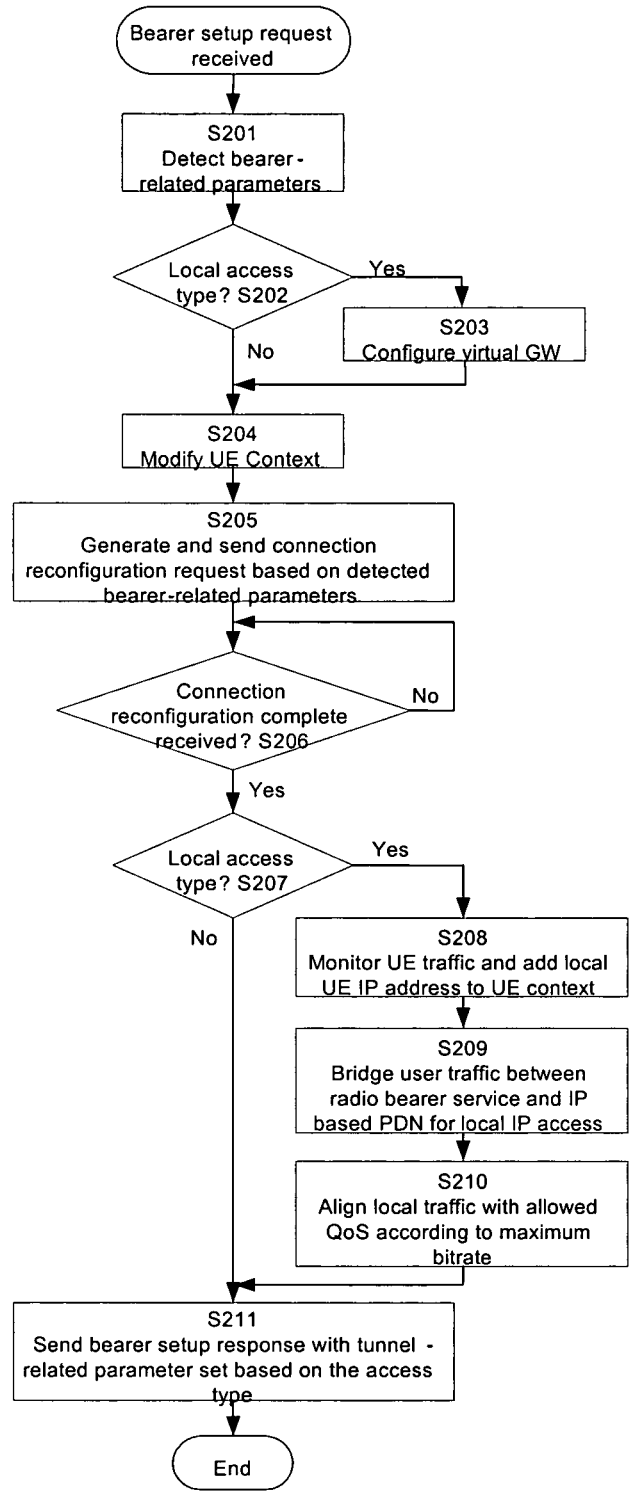
FIG. 6 shows a schematic flow diagram of a local breakout procedure at an access device side.

FIG. 6 shows a schematic flow diagram of a local IP access or LBO related processing at the HNB 20. The procedure of FIG. 6 is initiated when the HNB 20 receives a bearer setup request from the MME 30. In step S201, the HNB 20 detects bearer-related parameters (e.g. at the LBO control unit 204) and checks in step S202 whether a local access type is requested e.g. based on predetermined network address and TEID values (e.g. zeroes) in the message (e.g. by the LBO control unit 204).

If so, the virtual gateway at the HNB 20 is configured in step S203 (e.g. by the gateway configuring unit 205 under control of the LBO control unit 204).

In step S204, the context of the UE to which the LBO is related is modified (e.g. in the context storage 208 under control of the gateway configuring unit 205). Then, in step S205, a connection reconfiguration request is generated based on the detected bearer-related parameters (e.g. by the LBO control unit 204) and sent to the UE 10.

Now the HNB 20 waits for receipt of a connection reconfiguration complete message (step 206). If a reconfiguration complete message is received and local access type is determined to be set (step 207), the procedure continues in step S208, where the UE traffic is monitored and a received local UE IP address is added to the UE context (e.g. by the traffic monitoring unit 202). Then, in step S209 user traffic between the radio bearer service and the IP based PDN is bridged for the local IP access or LBO (e.g. by the traffic bridging unit 203). In step S210, local traffic is aligned with allowed Quality of Service (QoS) according to the allowed maximum bitrate if defined in the bearer-related parameters. Finally, a bearer setup response with tunnel-related parameter which are set based on the access type is sent in step S211 (e.g. under control of the LBO control unit 204).

Figure 7:
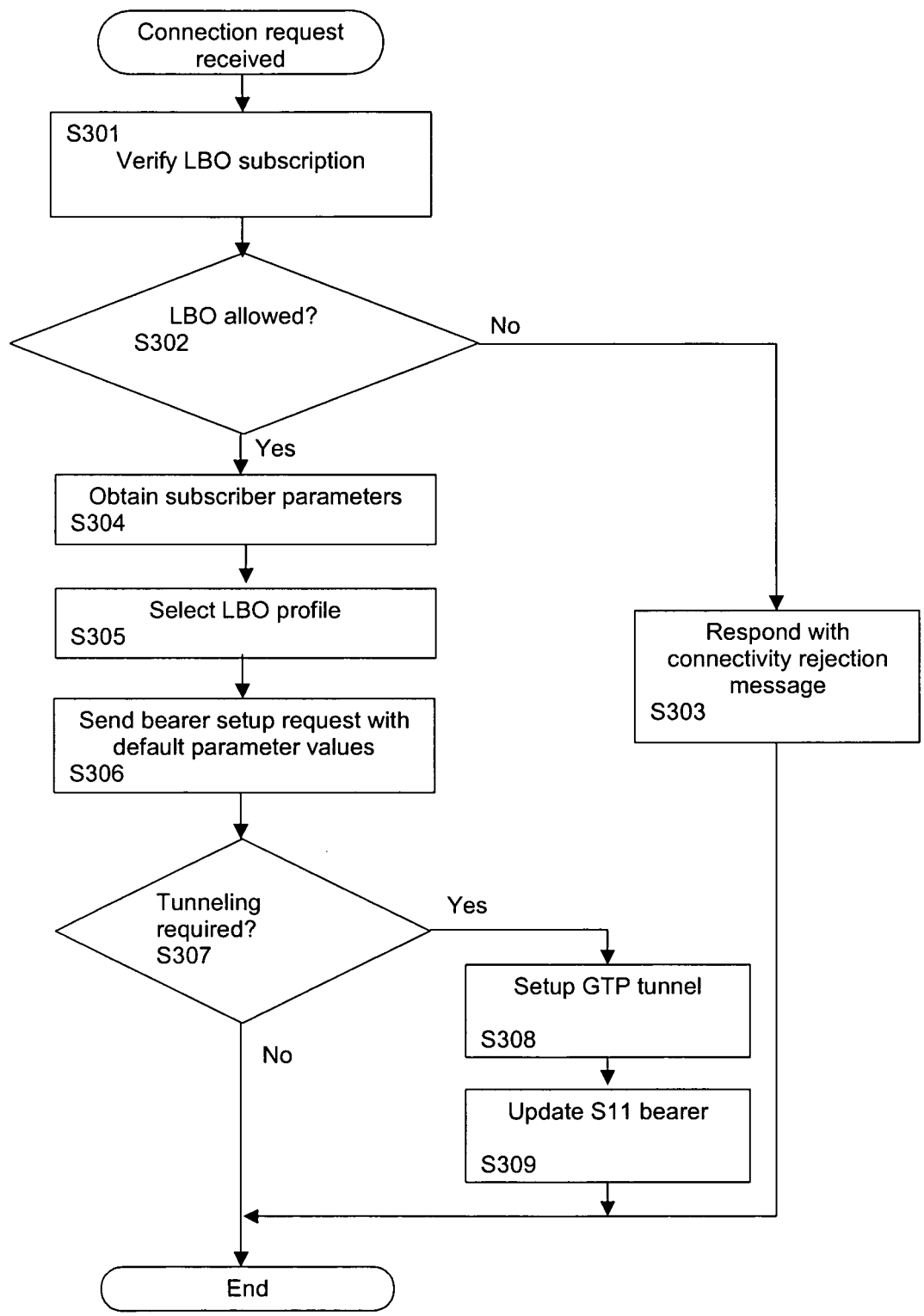
FIG. 7 shows a schematic flow diagram of a local breakout processing at a core network side.

FIG. 7 shows a schematic flow diagram of a local IP access or LBO related processing at the MME 30.

When a connection request is received from the UE 10 via the HNB 20, the procedure is triggered. In step S301 LBO subscription is verified (e.g. by the LBO control unit 304 based on a query of the HSS 50). If it is determined in step S302 that LBO is not allowed, the MME 30 may optionally respond to the UE 10 via HNB 20 with a connectivity rejection message, and the procedure ends. Otherwise, a corresponding parameter setting which indicates connectivity rejection may be signalled in subsequent steps. If LBO is allowed, subscription parameters are obtained in step S304 (e.g. based on a query at the HSS 50 or the other data base 90). Based on the obtained subscriber parameters, a corresponding LBO profile is selected in step S305 (e.g. by the LBO control unit 304). Then, in step S306 a bearer setup request with corresponding default parameter values is sent, wherein the default parameter values indicate the LBO profile (e.g. whether the UE 10 must obtain an IP address, whether the virtual gateway at the HNB 20 is used, and/or whether GTP tunnelling is required, etc.).

Then, the procedure checks in step S307 whether tunnelling is required, e.g. based on a corresponding parameter provided in the setup response. If tunnelling is required, e.g. since the virtual gateway at the HNB 20 is not used, a GTP tunnel is setup in step S308 (e.g. by the tunnel configuration unit 305). Furthermore, the S11 bearer between the external gateway of the core network and the HNB 20 is updated in step S309. If no tunnelling is required, the procedure ends directly after step S307.

According to another embodiment, a control function of the S11 interface (or other control plane interface between the HNB 20 and the core network) can be handled over the S1 interface to provide a paging trigger from the latest serving HNB upon received local IP access traffic or LBO traffic in downlink while the UE 10 has been moved to an idle state.

Figure 8:
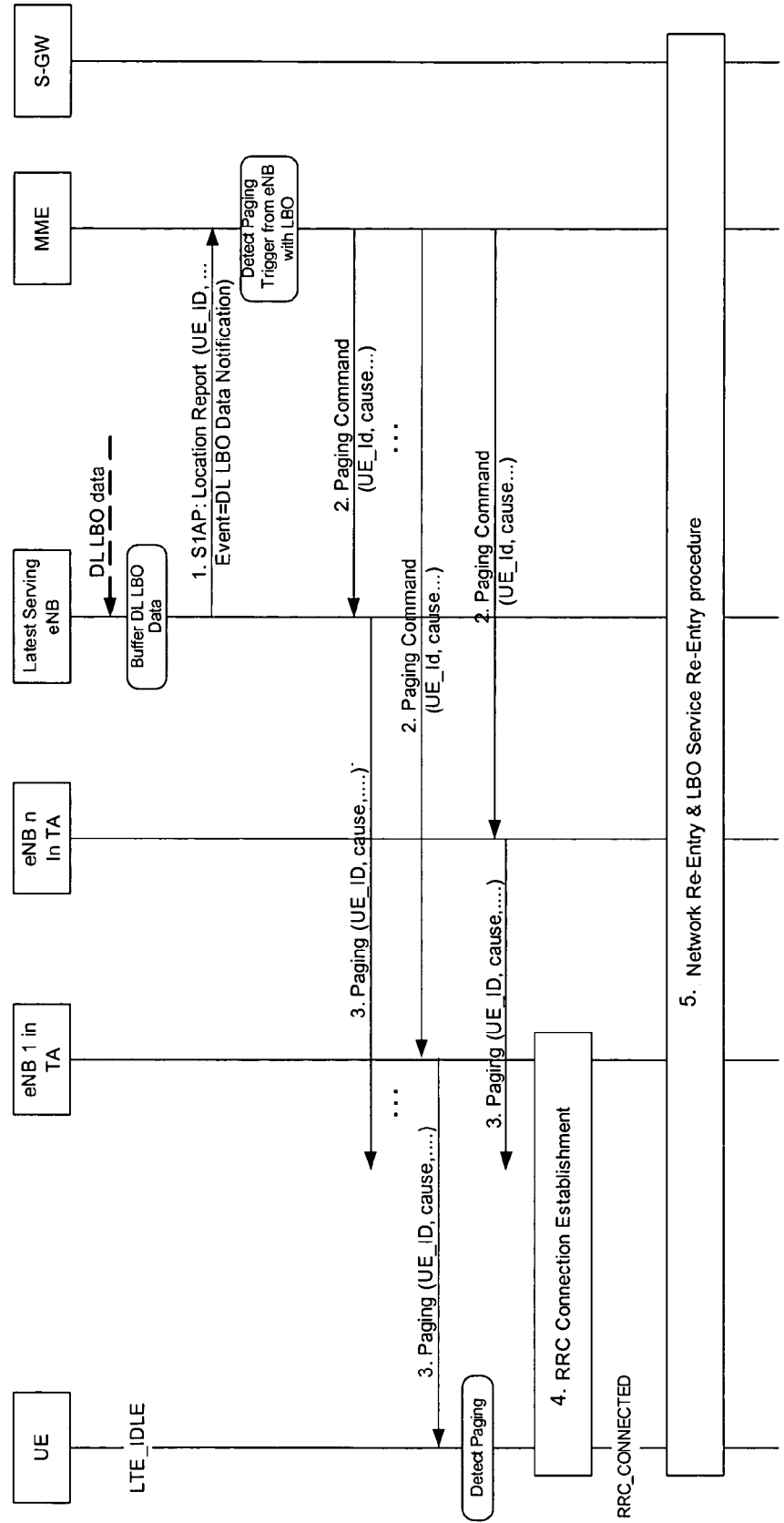
FIG. 8 shows a signalling and processing diagram for a paging-related processing.

FIG. 8 shows a schematic signalling and processing diagram of the other embodiment with local paging trigger function via the S1 interface. The trigger function is activated in case UE related downlink data arrives at the virtual gateway of the HNB 20.

According to FIG. 8, downlink (DL) LBO data is received at the latest serving HNB and buffered in a corresponding buffer for downlink LBO data. Then, in step 1, a location report with a corresponding identification of the concerned UE (which is currently in an idle state (e.g. "LTE_IDLE") and an indication that the event relates to downlink LBO data notification is forwarded to the MME. The MME detects this report as a paging trigger from the latest serving HNB with activated LBO. In step 2, the MME broadcasts a paging command with UE identification and cause parameter to the latest serving HNB and other HNBs 1 to n within the concerned tracking area (TA). The HNBs in the target area issue corresponding pagings with UE identification and cause parameters to their served UEs. If the targeted UE detects the paging it initiates an RRC connection establishment in step 4. Then it changes its mode from the idle mode to a connected mode (e.g. "RRC CONNECTED") and initiates a network re-entry and/or LBO service re-entry procedure in step 5.

Thus, upon reception of UE related downlink data in local IP access or LBO, a paging triggering message can be issued from the latest serving HNB to the MME over the S1 interface. In response thereto, the MME may continue a usual UE paging procedure. This new functionality of the S1 interface ("S1+") between the HNB and the MME can be combined e.g. with the Location Report message of the S1 application protocol in the manner shown in FIG. 8. The Location Report message could be extended with a new event type (e.g. DL LBO data notification) in the Request Type information element (IE) in order to support the local UE paging trigger from the HNB to the MME in local IP access or LBO.

In the following, implementation options for the above embodiments are described in more detail.

The UE forwards the APN to the MME in a PDN connectivity request message. The MME is aware that the UE requested APN points to a co-located virtual gateway at the HNB. This can be achieved by a corresponding configuration of the MME.

Furthermore, for LBO bearer handling, the MME includes one or more profiles which reflect different operator policies and/or subscriber types and/or HNB backhaul capabilities. The selected profile can be communicated or signalled via default values on behalf of the local PDN gateway. The default values can be used by the MME for the NAS messages and to set the parameters in the E-RAB setup of the S1 interface. For the UE IP address (PDN address) this default or predetermined value could be set to zero to thereby trigger the UE to attain the IP address (e.g. by the address selection unit 102 of FIG. 4) based on an IETF (Internet Engineering Task Force) mechanism after bearer establishment (e.g. DHCP). The S-GW transport layer IP address can be set to a predefined value that indicates to the HNB the local access type or LBO via its internal virtual gateway.

Additionally, the subscriber data of the users stored in the HSS can be enhanced with a permission for LBO and optional dedicated APN for LBO with corresponding APN-AMBR parameter and optional subscriber type information. The HNB backhaul capability parameter (e.g. indicating the digital subscriber line (DSL) speed of the HNB owner's fixed network connection) can be associated with closed subscriber group (CSG) data in the other database which could be established by an operation and maintenance (O&M) network functionality or introduced as a new parameter for the HNB initial setup procedure of the S1 interface and stored in the other database. This can be achieved internal or external to the MME.

Depending on the subscriber-related data of the HSS or another database, the MME can select the LBO profile accordingly. More specifically, the LBO gateway profile could comprise at least one of the mentioned reserved values for the UE IP (PDN) address and the gateway, the APN AMBR parameter for the LBO bearers to calculate the UE-AMBR in the MME (taking into account if LBO is in parallel to an EPS bearer) which may take precedence over a HSS stored APN AMBR, a local/virtual PDN gateway value for a maximum APN restriction feature to check if LBO is allowed in parallel to other existing PDN connections, and traffic flow templates depending on the APN, subscriber type etc. if the access should be limited to a certain filter criteria.

As regards handling of local IP access or LBO bearer service and co-located virtual gateway setup over the S1 interface, the MME may add the following bearer-related information elements to the bearer setup request message based on the LBO subscription profile and operator policies:
UE aggregate maximum bitrate (UE-AMBR)
APN aggregate maximum bitrate (APN-AMBR)
bearer setup information elements:
bearer identification
bearer level QoS parameters
transport layer address with predefined value (e.g. zero) indicating no GTP tunnel and point address needed
TEID with value zero indicating that no GTP tunnelling is needed
NAS PDU containing a ciphered NAS protocol message (e.g. Activate Default EPS Bearer Context Request) from MME to UE where a value zero may be set for the PDN address (alternatively the MME may respond with a connectivity rejection message if the LBO service is not allowed for the target UE).

The HNB can now detect based on the received predefined (zero) values in the transport layer address and TEID information elements that this bearer setup is intended to use its co-located (internal) virtual gateway for the local IP access or LBO service. Thus, instead of setting up a GTP tunnel endpoint for the S1-U connection, the HNB configures its local virtual gateway function according to the received bearer parameters.

Then, the HNB can send the connection reconfiguration message in order to configure the radio bearer service for the requested radio bearer with the given parameters. In this message the HNB can forward among other information the NAS PDU that is the response from the MME to the UE's connectivity request.

The UE configures its EPS bearer service according to the parameters received in the reconfiguration message and the NAS PDU and responds to the HNB with the connection reconfiguration complete message. As the received PDN address in the NAS PDU had a value zero, the UE can prepare itself to configure an IP address for this PDN connectivity (local IP access or LBO) using either DHCP or IPv6 address auto-configuration or the like over the newly established EPS bearer service. Correspondingly, the HNB can prepare to monitor UE traffic over the newly established bearer service in order to assist the UE either as a DHCP relay or a proxy function in IPv6 neighbour discovery procedures towards the LAN.

After the UE has assigned the local IP address using the address configuration procedures also the HNB has processed the related messages and is able to read the UE local IP addresses and to add the information to the UE context data in order to perform IP lookup based user traffic bridging between the radio bearer service and the "native IP" based local area network or other PDN for the local IP access or LBO service. Moreover, the HNB can activate a traffic shaping function as part of its local gateway functionality to align the local traffic with the allowed QoS according to the APN AMBR.

Finally, the HNB sends the setup response message to the MME indicating that the requested bearer setup has succeeded. As a GTP tunnel does not need to be established for the local IP access bearer, the corresponding information elements in the setup response can be set in the HNB to predefined or default values, such as the value zero for the transport layer address and the GTP TEID (HNB TEID) and user datagram protocol (UDP) port number indicating that no tunnel endpoint address and no tunnelling is needed.

Upon reception of the modified setup response message, the MME can omit the S11 update bearer procedure as the concerned local IP access bearer service uses the co-located virtual gateway in the HNB. This can be explicitly detected from the received radio bearer identification, transport layer address values and UDP port number values.

The proposed optimized "S1+" based approach provides the advantage of a simplified LBO control procedure with minimal number of messages using a single interface between the access network and the core network with no need for terminating additional core network interfaces at the access node (e.g. HNB) of the access network.

Additionally, a simplified implementation of a local IP mobility function is enabled in inter-HNB handovers with LBO in L2 switched LAN networks like home/office/campus LANs without a need to perform S-/P-GW relocation procedures on every handover, as it would be the case if other interfaces (like the S11 interface) would be terminated at the HNB. Now, the management of the co-located virtual gateway for a simple local IP access can be handled locally after the local IP access service has been setup. In inter-HNB handovers there is no need to perform tunnel path switching for local IP access bearer services via the MME to the S-GW. Furthermore, NAS and RRC interfaces do not need to be modified.

Implementation of the MME functionality can be based on an attach to a home cell or a use of UE requested PDN connectivity procedure in the home cell (with APN or default APN indicator). The MME can check if a local breakout bearer (LBB) shall be established. Criteria for this check are whether the UE is in the home cell (according to the cell identifier) or whether it accesses a network that can provide a local IP access. Additionally, a criteria could be whether the APN is allowed for LBO (e.g. a dedicated APN or a default APN), or whether the UE is allowed for LBO (by checking the subscription data). Additionally, the MME can check if the UE is allowed for CSG access (e.g. located in a home cell based on the cell identifier or the HNB address information) or is located in a HNB area with LBO possibility. In this case, the MME may perform optionally a gateway selection procedure, wherein a reserved value of the S-/P-GW address (e.g. 127.0.0.1) may indicate that the UE requests LBO and that LBO is allowed for this APN. Or, the MME may decide if LBO is allowed for that APN with a new procedure. The MME may apply operator policies for LBO allowed APNs (like for the Internet) to allow LBO or not. In certain conditions, the LBO possibility may be overruled and the MME may assign a gateway address of the mobile network operator.

Additionally, the MME may check if LBO is allowed for that user (based on subscription data stored in the HSS). For this purpose, the subscription data in the HSS could be enhanced and/or a maximum APN restriction feature could be used to decide whether LBO is allowed in parallel to other mobile network operator bearers if other bearers of that UE are established through the operators S-GW and P-GW (for the UE requested PDN connectivity procedure).

To setup the LBB, the MME may setup a session management context for that bearer that can be identified in later procedures as LBO (e.g. by an LBO indicator, a reserved S-/P-GW address or a stored APN). This contact triggers a special LBO handling in the MME for later actions for that bearer. The MME may skip gateway selection procedures and may assign a reserved value for the P- and S-GW addresses. Additionally, the MME may skip a create default bearer request procedure.

Furthermore, the MME may select the right LBO profile to setup the message parameters for the bearer setup request. The reserved S-GW address or a LBO indicator may indicate to the HNB that an LBB shall be used.

In case of a handover from a home to a macro cell, the handover can be performed for the bearers that are terminated in the operator network only. In case of an EUTRAN internal handover, the HNB may remove the LBB from the list of bearers to be handed over (SAE bearer setup list) and releases the bearer towards the UE. The MME removes those bearers marked as LBB from the UE session management context.

Figure 9:
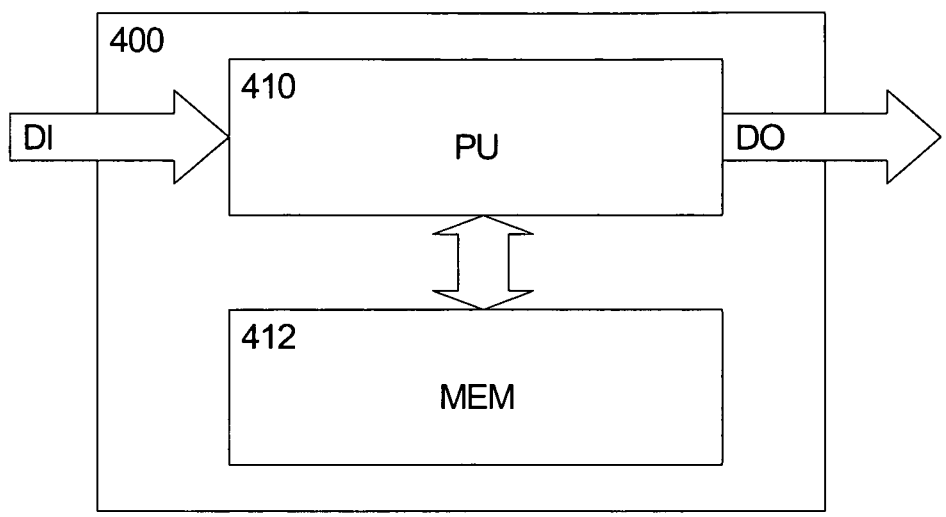
FIG. 9 shows a schematic block diagram of a software based implementation according to another embodiment.

FIG. 9 shows a schematic block diagram of an alternative software-based implementation according to another embodiment. The required functionality can be implemented in any base station type network entity 400 with a processing unit 410, which may be any processor or computing device with a control unit which performs control based on software routines of a control program stored in a memory 412. The control program may also be stored separately on a computer readable medium. Program code instructions are fetched from the memory 412 and are loaded to a control unit of the processing unit 410 in order to perform the processing steps of the device-specific functionalities described in connection with FIGS. 3 to 8, which may be implemented as the above mentioned software routines. The processing steps may be performed on the basis of input data DI and may generate output data DO. In case of the processing performed at the terminal device (e.g. UE), the input data DI may correspond to a signalling received via the radio interface and the output data DO may correspond to the connectivity request and/or connection reconfiguration complete message. In case of the processing performed at the access device (e.g. HNB), the input data DI may correspond to messages received from the core network (e.g. MME) and the output data DO may correspond to the bearer setup response issued to the core network. In case of the processing at the core network entity (e.g. MME), the input data DI may correspond to messages received via the S1 interface and the output data DO may correspond to the bearer setup request issued to the access device.

Consequently, the functionalities of the above embodiments of the terminal device, access device and core network entity may be implemented as respective computer program products comprising code means for generating each individual step of the processing and/or signalling procedures for the respective entities or functions when run on a computer device or data processor of the respective entity.

In summary the present invention relates to methods, apparatuses, and computer program products for interrelated entities of a network system for providing access via a cellular access network to a packet network, wherein a simple local IP access or local breakout (LBO) feature is provided, which uses a bridging function between a packet data network interface and a radio interface at an access device (e.g. base station device or (H)NB) that can be controlled by a single control plane interface.

It is apparent that the invention can easily be extended to any network environment where an access device of a radio access network is connected to a core network having a mobility management entity or a similar entity and corresponding gateway functionalities for providing access to other PDN networks. The invention is not intended to be restricted to the specific messages explained in connection with FIGS. 3 and 8 but can be extended to any corresponding messages having the same or similar functionalities. In addition, the invention is not limited to the described interfaces and can be extended to any interface between an access device of a radio access network and a mobility management entity or similar entity of a core network.

The invention claimed is:

1. An access device comprising:
deriving means for deriving at the access device radio bearer-related parameters from a bearer setup request, the bearer setup request having been received from a mobility management entity being an entity external to the access device and the bearer setup request having at least one bearer-related parameter indicating that tunnelling is not required;
determination means for determining a local breakout based on said derived parameters;
gateway configuration means for configuring a gateway functionality co-located at said access device in response to said determination means; and
traffic bridging means for bridging user traffic in the link layer between a radio bearer service requested by said bearer setup request and a packet data network for said local breakout.

2. The access device according to claim 1, wherein said access device is configured to issue a bearer setup response with a predefined value for at least one of a transport layer address and a tunnel endpoint identifier, said predefined value indicating that no tunnelling is needed.

3. The access device according to claim 1, wherein said access device is configured to receive said bearer setup request with an S1-type control plane interface.

4. The access device according to claim 3, wherein said gateway functionality is only controlled via said S1-type control plane interface.

5. The access device according to claim 3, wherein said access device is configured to be provided in a base station device of a cellular network.

6. The access device according to claim 3, wherein said access device is configured to issue a paging trigger for an idle terminal via said S1-type control plane interface.

7. The access device according to claim 1, wherein said access device is configured to remove a local breakout bearer from a list of bearers to be handed over and to release said local breakout bearer towards said terminal device in case of a handover procedure.

8. A system comprising the access device of claim 1 and an apparatus comprising:
selecting means for selecting at a terminal device and in response to a detected availability of a local breakout service an identification of a gateway functionality co-located at the access device of a radio access network, for use in a local breakout to a packet data network;
address configuration means for configuring a network layer address for said terminal device in said local breakout; and
message generating means for generating a connectivity request indicating said identification, to be transmitted to said radio access network.

9. A system comprising the access device of claim 1 and an apparatus comprising:
selecting means for selecting at a core network a set of parameters for local breakout based on an identification of a gateway functionality co-located at an access device of a radio access network; and setting means for setting predetermined default parameter values in a bearer setup request to indicate local breakout at said gateway functionality.

10. An access device according to claim 1 which is adapted to include in a received connectivity request an access point name pointing to the gateway functionality and to forward the connectivity request to a mobility management entity.

11. A method at an access device comprising:
deriving at the access device radio bearer-related parameters from a bearer setup request, the bearer setup request having been received from a mobility management entity being an entity external to the access device and the bearer setup request having at least one bearer-related parameter indicating that tunnelling is not required;
determining a local breakout based on said derived parameters;
configuring a gateway functionality co-located at said access device in response to said determination; and
bridging user traffic in the link layer between a radio bearer service requested by said bearer setup request and a packet data network for said local breakout.

12. The method according to claim 11, further comprising issuing a bearer setup response with a predefined value for at least one of a transport layer address and a tunnel endpoint identifier, said predefined value indicating that no tunnelling is needed.

13. The method according to claim 11, further comprising receiving said bearer setup request via an S1-type control plane interface.

14. The method according to claim 13, further comprising only controlling said gateway functionality via said S1-type control plane interface.

15. The method according to claim 13, further comprising issuing a paging trigger for an idle terminal via said S1-type control plane interface.

16. The method according to claim 11, further comprising removing a local breakout bearer from a list of bearers to be handed over and releasing the local breakout bearer towards the terminal device in case of a handover procedure.

17. A computer program product, embodied on a non-transitory computer readable medium, comprising code means for producing the steps of method claim 11 when run on a computing device.

* * * * *